June 16, 1931.   B. HASKELL   1,810,707

BRAKE BEAM GUARD ARM

Filed April 1, 1930

WITNESSES
A. B. Wallace.
E. O. Johns

INVENTOR
Broderick Haskell
By Brown & Critchlow
Attorneys.

Patented June 16, 1931 1,810,707

UNITED STATES PATENT OFFICE

BRODERICK HASKELL, OF FRANKLIN, PENNSYLVANIA, ASSIGNOR TO DAVIS BRAKE BEAM COMPANY, OF JOHNSTOWN, PENNSYLVANIA, A CORPORATION OF PENNSYLVANIA

BRAKE BEAM GUARD ARM

Application filed April 1, 1930. Serial No. 440,745.

The invention relates to safety guards or arms attached to railway car trucks below the brake beams of brake gears for supporting the beams in case their supporting brake hangers or other connections fail.

The object is to provide a simple and effective means for supporting a safety arm in such manner that it is continuously held in its operative position, the connecting means being so formed that a safety arm may be quickly and easily attached to and removed from a truck.

Figure 1:
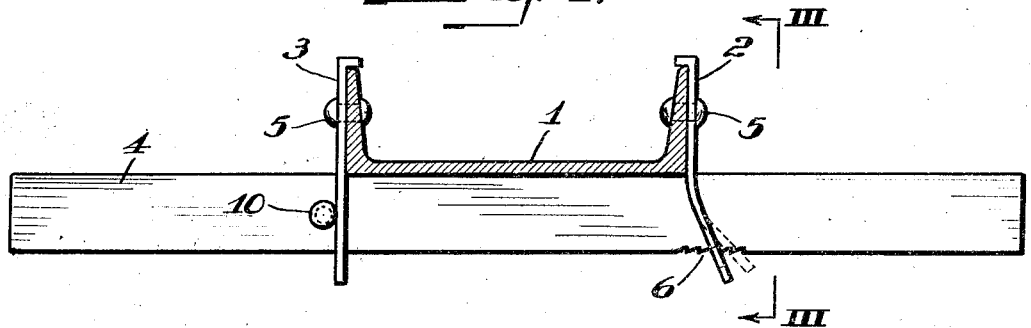
Figure 2:
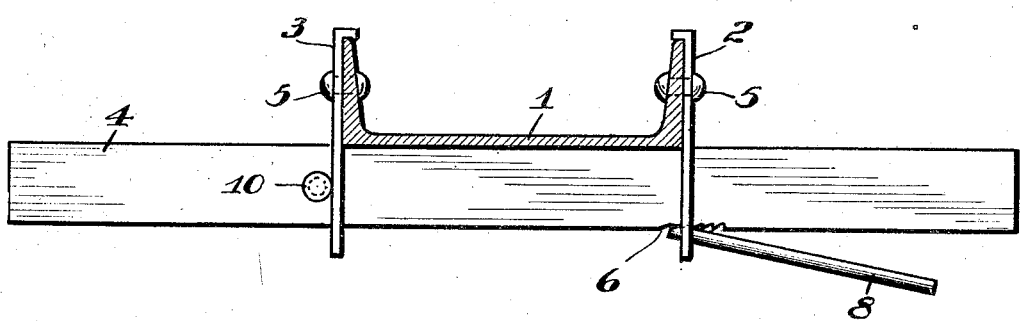
Figure 3:
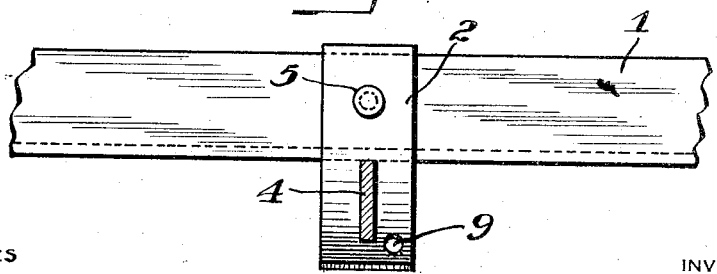

The invention is illustrated in the accompanying drawings, of which Fig. 1 is a combined transverse sectional view of a spring plank of a railway car truck and a side elevation of a safety arm showing it attached to the spring plank; Fig. 2 a view corresponding to Fig. 1 showing the arm-attaching means moved to a position for applying the safety arm to or removing it from a truck; and Fig. 3 a view taken on the plane indicated by the line III—III, Fig. 1.

According to this invention, a brake beam guard bar or arm is attached to a spring plank of a railway car truck by means of a resilient bracket connected to the spring plank and provided with an opening to receiving and supporting the bar, the bracket being so formed that it yieldingly engages the bar to normally lock it in operative position. Preferably, the spring plank or an equivalent supporting member of a railway car truck is provided with two brackets for receiving and supporting a guard bar, one being formed for locking the bar in the manner just explained, and the other being formed to merely receive and support the guard bar, means being attached to the bar for engaging the said other bracket to prevent longitudinal movement of the bar. However, if desired, both of the brackets may be formed of resilient spring metal and shaped to yieldingly engage the bottom of a guard bar to lock it in operative position.

Having reference to the illustrative embodiment of the invention, a spring plank 1 of the railway car truck is shown as having attached to it two brackets 2 and 3, each provided with a slot for receiving a guard bar 4, which is preferably in the form of a simple plate of suitable depth and thickness for its intended purpose. While these brackets may be variously attached to the spring plank, they are illustrated as being connected to it by rivets 5. Bracket 2, which in this embodiment of the invention locks the guard bar in operative position, is formed of resilient spring metal with its lower end turned laterally and upwardly so that it yieldingly engages the bottom of bar 4 to lock it in position. Preferably, the lower edge of the bar is provided with a plurality of notches 6 for engagement by the upper edge of the slot formed in the bracket. When bar 4 is removed from the bracket, the lower end of the bracket, being unstressed, lies in the position indicated in dotted lines in Fig. 1.

To apply a bar 4 to bracket 2, the lower end of the bracket is flexed downwardly while the end of the bar is slipped through the bar-receiving slot of the bracket. This may be done by inserting a suitable tool, such as a bar 8, illustrated in Fig. 2, in a suitable opening 9 (Fig. 3) in the lower end of the bracket, and turning the outer end of the bar downwardly to the position shown in Fig. 2. The right end of bar 4, as viewed in Figs. 1 and 2, may then be slipped through the slot in bracket 3 from left to right, and through the corresponding slot or opening in the downwardly turned end of bracket 2. When arm 4 is in its operative position, the downward pressure on the lower end of bracket 2 is released to permit such end to spring upwardly to yieldingly engage the bottom of the supporting arm and lock it in position. To resist any tendency of supporting arm 4 moving from left to right beyond its operative position, such bar is preferably provided with a rivet or other suitable projection 10 which abuts against the face of bracket 3 when arm 4 is in its operative position.

By the means provided according to this invention, a safety arm may be quickly and easily attached to or removed from a truck, and when connected to the truck it is securely held in position.

According to the provisions of the patent statutes, I have explained the principle and operation of my invention, and have illustrated and described what I now consider to represent its best embodiment. However, I desire to have it understood that, within the scope of the appended claims, the invention may be practiced otherwise than as illustrated and described.

I claim as my invention:

1. In a railway car truck, a spring plank, a brake beam guard bar below the spring plank, and a resilient bracket attached to said spring plank and provided with an opening for receiving and supporting said bar, said bracket yieldingly engaging said bar to normally lock it in operative position.

2. In a railway car truck, a spring plank, a brake beam guard bar below the spring plank, and a resilient bracket attached to said spring plank and provided with an opening for receiving and supporting said bar, the lower end of said bracket being turned upwardly to yieldingly engage the bottom of said bar to normally lock it in operative position, the bar being released from the bracket by springing the lower end of the latter downwardly.

3. In a railway car truck, a spring plank, a brake beam guard bar below the spring plank and provided with a notch on its lower face, and a bracket formed of resilient spring metal attached to said spring plank and provided with an opening for receiving and supporting said bar, the lower end of said bracket being turned upwardly to yieldingly engage said bar notch.

4. In a railway car truck, a spring plank, a brake beam guard bar below the spring plank, and a pair of brackets attached to the opposite sides of the spring plank and provided with openings for receiving and supporting said bar, one of said brackets being formed of resilient spring metal and having its lower end turned upwardly to yieldingly engage the bottom of said bar to lock it in operative position.

5. In a railway car truck, a spring plank, a brake beam guard bar below the spring plank, a pair of brackets attached to the opposite sides of the spring plank and provided with openings for receiving and supporting said bar, one of said brackets being formed of resilient spring metal and having its lower end turned upwardly to yieldingly engage the bottom of said bar to lock it in operative position, and means attached to said bar for engaging the other of said brackets to prevent longitudinal movement of the bar.

In testimony whereof, I sign my name.

BRODERICK HASKELL.